US005289163A

United States Patent [19]

Perez et al.

[11] Patent Number: 5,289,163

[45] Date of Patent: Feb. 22, 1994

[54] CHILD POSITION MONITORING AND LOCATING DEVICE

[76] Inventors: Carla D. Perez, 1264 Greenwich Dr., Riverside, Calif. 92501; Bertha D. Perez, 16920 Corwin Rd., Apple Valley, Calif. 92307

[21] Appl. No.: 945,371

[22] Filed: Sep. 16, 1992

[51] Int. Cl.[5] .......................... G08B 1/08; H04Q 7/00

[52] U.S. Cl. .................................... 340/539; 340/525; 340/573; 340/691; 340/825.36; 340/825.49; 342/419

[58] Field of Search ............... 340/539, 531, 525, 573, 340/571, 572, 691, 825.36, 825.49; 455/67.1, 9, 115, 134, 226.2, 228, 229; 342/56, 385, 386, 417, 419, 450

[56] References Cited

U.S. PATENT DOCUMENTS

| | | | |
|---|---|---|---|
| 3,333,271 | 7/1967 | Robinson et al. . | |
| 4,021,807 | 5/1977 | Culpepper et al. . | |
| 4,468,656 | 8/1984 | Clifford et al. | 340/539 |
| 4,476,469 | 10/1984 | Lander . | |
| 4,593,273 | 6/1986 | Narcisse . | |
| 4,704,612 | 11/1987 | Boy et al. . | |
| 4,785,291 | 11/1988 | Hawthorne . | |
| 4,918,425 | 4/1990 | Greenberg et al. | 340/539 |
| 5,021,794 | 6/1991 | Lawrence . | |
| 5,055,851 | 10/1991 | Sheffer | 340/539 |
| 5,086,290 | 2/1992 | Murray et al. | 340/539 |
| 5,115,223 | 5/1992 | Moody | 340/539 |

*Primary Examiner*—Donnie L. Crosland
*Attorney, Agent, or Firm*—Richard C. Litman

[57] ABSTRACT

A child position monitoring device monitors the position of a child by detecting the signal strength of a radio frequency carrier from a transmitter attached to the child. If the signal of the radio frequency carrier is to weak, the child is to far away from the adult who has the child position monitoring device. When this happens, the adult is informed that the child has wandered to far away through the use on an audio tone or through the use of vibrations coming from the device. Once the adult is notified that the child is too far away, the device also has a locating display for indicating the relative direction of the child with respect to the adult. The display uses eight LEDs arranged around an emblem used to represent the position of the adult. The LED which lights up indicates the relative direction of the child.

14 Claims, 4 Drawing Sheets

| RANGE | D1 | D2 | D3 | D4 | D5 | D6 | D7 | D8 |
|---|---|---|---|---|---|---|---|---|
| 341°– 19° | 1 | 0 | 0 | 0 | 0 | 0 | 0 | 0 |
| 20°– 25° | 1 | 1 | 0 | 0 | 0 | 0 | 0 | 0 |
| 26°– 64° | 0 | 1 | 0 | 0 | 0 | 0 | 0 | 0 |
| 65°– 70° | 0 | 1 | 1 | 0 | 0 | 0 | 0 | 0 |
| 71°–109° | 0 | 0 | 1 | 0 | 0 | 0 | 0 | 0 |
| 110°–115° | 0 | 0 | 1 | 1 | 0 | 0 | 0 | 0 |
| 116°–154° | 0 | 0 | 0 | 1 | 0 | 0 | 0 | 0 |
| 155°–160° | 0 | 0 | 0 | 1 | 1 | 0 | 0 | 0 |
| 161°–199° | 0 | 0 | 0 | 0 | 1 | 0 | 0 | 0 |
| 200°–205° | 0 | 0 | 0 | 0 | 1 | 1 | 0 | 0 |
| 206°–244° | 0 | 0 | 0 | 0 | 0 | 1 | 0 | 0 |
| 245°–250° | 0 | 0 | 0 | 0 | 0 | 1 | 1 | 0 |
| 251°–289° | 0 | 0 | 0 | 0 | 0 | 0 | 1 | 0 |
| 290°–295° | 0 | 0 | 0 | 0 | 0 | 0 | 1 | 1 |
| 296°–334° | 0 | 0 | 0 | 0 | 0 | 0 | 0 | 1 |
| 335°–340° | 1 | 0 | 0 | 0 | 0 | 0 | 0 | 1 |

FIG. 6

CHILD POSITION MONITORING AND LOCATING DEVICE

BACKGROUND OF THE INVENTION

1. Field of the Invention

The present invention relates to location monitoring devices which are used to alert a user when another object or person is located outside a set proximity zone. More specifically, the present invention relates to those location monitoring devices which are compact, portable, and display the relative location of the other person once outside the proximity zone.

2. Description of the Prior Art

U.S. Pat. No. 4,593,273 issued Jun. 3, 1986 to Bernadine O. Narcisse discloses a proximity monitoring device in which a base unit is alerted whenever a mobile unit is outside of a certain range as set by a threshold detector on the mobile unit.

U.S. Pat. No. 3,333,271 issued Jul. 25, 1967 to Stephen J. Robinson et al. discloses a receiver system for measuring the angular direction of propagation of a transmitted frequency relative to the receiver system.

U.S. Pat. No. 4,021,807 issued May 3, 1977 to Jerry W. Culpepper et al. discloses a beacon tracking system in which the location and distance of a beacon can be monitored from a police cruiser.

U.S. Pat. No. 4,785,291 issued Nov. 15, 1988 to Candy C. Hawthorne discloses a proximity detector for monitoring the proximity of a child.

U.S. Pat. No. 4,476,469 issued Oct. 9, 1984 to David R. Lander discloses a locating device for finding commonly lost articles.

U.S. Pat. No. 5,021,794 issued Jun. 4, 1991 to Robert A. Lawrence discloses a personal emergency locator network which may be used to locate a lost child.

U.S. Pat. No. 4,704,612 issued Nov. 3, 1987 to Boy et al. discloses locating transmitter and receiver system for locating a hunting arrow in which the transmitter is located before it is shot. The receiver uses a directional antenna to determine the relative angular position of the receiver relative to the arrow having the transmitter located therein.

None of the above inventions and patents, taken either singly or in combination, is seen to describe the instant invention as claimed.

SUMMARY OF THE INVENTION

The child position monitoring and locating device of the present invention monitors the distance a child wanders from device of the present invention. A transmitter is placed on the child which transmits a radio frequency carrier at a predetermined frequency and a predetermined signal strength. The device of the present invention is shaped like a conventional beeper and may be worn by an adult in charge of the child at the time. The device is water-proof and provides an alert signal indication to the adult whenever the child moves outside of a fixed range of the adult. The device allows the adult to set the fixed range within a given range of the device. The alert signal may selectively take the form of an audio signal or a vibration signal.

Once the adult is aware that the child is outside of the fixed range, a direction display on the front face of the device allows the adult to determine the relative angular direction of the child when the face of the display is placed in an upward horizontal position. The display has a center position representing the position of the adult using the device as well as a plurality of light emitting diodes (LEDs) surrounding the center position to indicate the direction of the child from the center position when a straight line is drawn from the center position to the LED which is lit.

Accordingly, it is a principal object of the invention to provide a small, compact, and easily carried child monitoring device for locating a child which has wandered from the adult using the device.

It is another object of the invention to provide the adult with an alert signal indication in the form of an audio signal or a vibration signal whenever the child is located outside of a fixed range from the adult.

It is a further object of the invention to of the present invention to provide a child position monitoring and locating device in which the fixed range for alerting the adult may be set by the adult.

It is a further object of the present invention to provide a child position monitoring and locating device which is water-proof.

It is still a further object of the present invention to provide a visual display of the relative angular position of the child with respect to the adult which is easily interpreted by the adult.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 6 is a diagram illustrating the relationship between the relative angle of the LEDs on the display and angular position of the child with respect to the device of the present invention.

Similar reference characters denote corresponding features consistently throughout the attached drawings.

DETAILED DESCRIPTION OF THE PREFERRED EMBODIMENT

Figure 1:
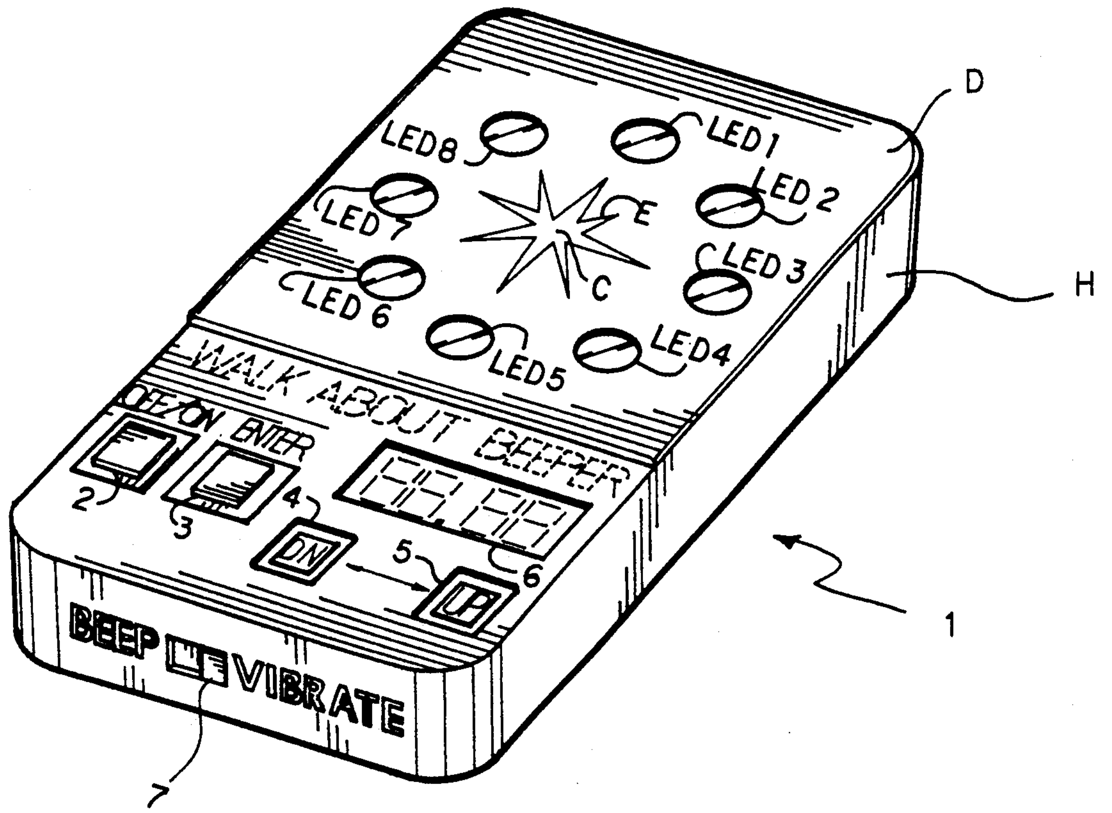
FIG. 1 is a side view of the present invention.

As shown in FIG. 1, a child position monitoring and locating device 1, herein referred to as a location monitoring device 1, allows an adult using the device 1 to monitor the distance a child wanders from device 1 of the present invention. The location monitoring device 1 has an outer housing H which is compact and portable and has the shape similar to that of the commonly used beepers. The housing H has a front side having a display D for indicating the direction of a locating transmitter (not shown). The locating transmitter could be any of the conventional transmitters used in proximity detectors which transmit radio frequency carriers, such as disclosed by Culpepper et al. The locating transmitter could be pinned onto the child or attached to the child in any conventional manner.

Once the location monitoring device 1 detects that the child has wandered to far from the adult having the device, an alert signal indicator is activated to inform the adult of the situation. With the display D in the horizontal position the adult can determine the direction of the child relative to the facing direction of the adult. In the center of the display D is an emblem E which represents the location of the adult. The adult is assumed to be facing in a given reference direction which is illustrated on the display D by a linear direction from the emblem E to the first light generator LED1. The light generator LED1 is preferably a light emitting diode (LED). One of the LEDs (LED-1-LED8) lights up to indicate the direction of the child relative to the adult. For example, if LED3 lights up, the child is to the right of the adult.

As shown in FIG. 1, the location monitoring device 1 has a display 6 for indicating the maximum distance the child may be located from device 1 without activating the alert signal indicator. This distance may be increased by pressing the up button 5 or decreased by pressing the down button 4. When either the up or down button is pressed, the numeric value illustrated by display 6 is increased or decreased accordingly. Once the numeric value illustrated by the display 6 represents the desired maximum distance the child is allowed to be from the location monitoring device 1, then the enter button 3 is pressed to set the maximum distance the child may be located from the device 1 without activating the alert signal indicator as that distance represented by the numeric value shown on display 6. Display 6 is preferably includes four seven-segment LEDs or four seven-segment liquid crystal displays.

Figure 2:
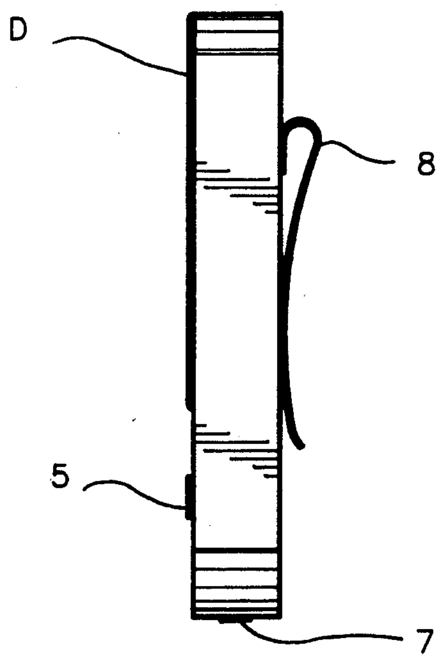
FIG. 2 is a front perspective view of the present invention.

As shown in FIG. 1, the location monitoring device 1 also includes a switch 7 to activating an audio signal (e.g., a beep) or a vibration generator in accordance with the preference of the user. The location monitoring device 1 also includes an OFF/ON switch for alternatively connecting and disconnecting all electronic components of the device 1 to a portable power supply, e.g., a battery. As shown in FIG. 2, the location monitoring device also includes a clip 8 for connecting the device 1 to an article of clothing to the adult user of the device 1.

Figure 3:
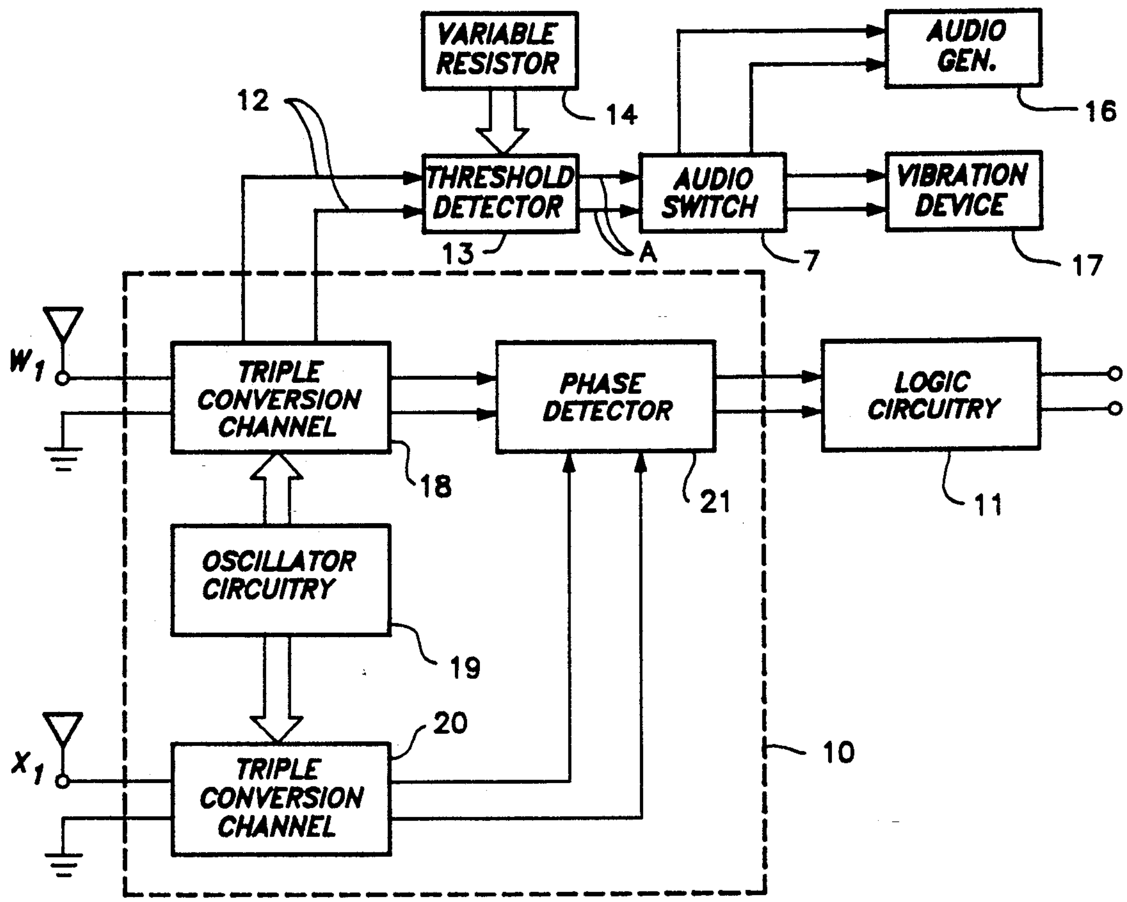
FIG. 3 is a partial block diagram of the present invention.
Figure 4:
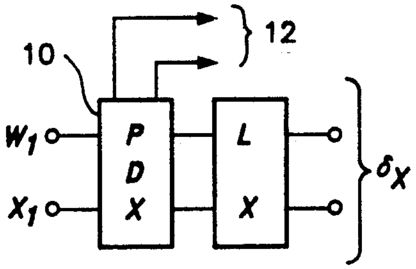
FIG. 4 is a partial block diagram of the present invention.

The location monitoring device 1 utilizes an orthogonal antenna array pair for receiving the radio frequency carrier of the locating transmitter as shown by Robinson et al., made of record and incorporated herein by reference (see FIG. 3 of Robinson et al.). As shown in FIG. 4 of Robinson et al., each of the antenna arrays have successive antenna pairs proceeding from the inner most pair, e.g., $W_1$ and $X_1$, to the outer most pair most pair, e.g. $W_4$ and $X_4$, connected to a unique phase discriminator, wherein each of successive antenna pairs of each antenna array has all other prior antenna pairs of the same antenna array located therebetween. Each phase discriminator is in turn connected to a logic circuit, and the four logic circuits connected an antenna array produces one Cartisean coordinate while the other four produce another Cartesian coordinate. Once the Cartisean coordinates are obtained, the angle of propagation of the radio frequency carrier can be obtained using simple trigonometry.

Figure 7:
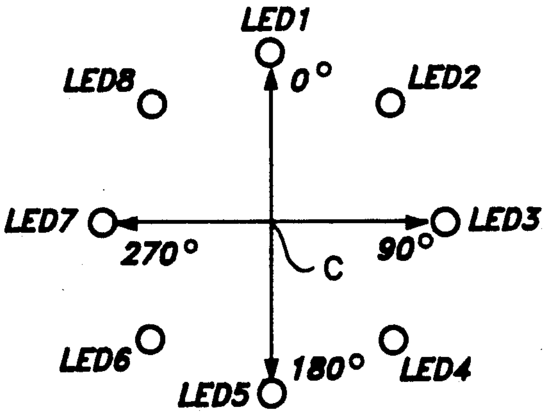
FIG. 7 is a decision table which may be used by the microprocessor to decide which LED to light-up.

In the present invention, it is desirable not only to know the angle of propagation of the radio frequency carrier, but also the signal strength of the radio frequency carrier. A phase discriminator circuit which can also determine signal strength is shown in Culpepper et al., made of record and incorporated herein by reference. As shown in FIG. 7 of Culpepper et al., a phase discriminator circuit uses two triple conversion channels 104 and 106, each one feed with a particular antenna signal and a plurality of oscillator signals to down shift the signals coming from the antennas. Each of the triple conversion channels 104 and 106 have their outputs feed to a phase detector to produce the output of the phase discriminator of Culpepper et al. As disclosed by Culpepper et al., an automatic gain control (AGC) signal of a triple conversion channel is feed to a distance indicator 146 to provide a distance indication in accordance with signal strength, i.e., the average voltage level, of the AGC signal.

As shown in FIG. 3 of the present invention, a phase discriminator 10 utilizes the advantages of an AGC signal to produce a signal whose signal strength is indicative of the distance the locating transmitter is located from the location monitoring device. Since the locating transmitter transmits the radio frequency carrier at a predetermined signal strength, the distance of the locating transmitter can be determined. More specifically, a phase discriminator 10 is shown utilizing two triple conversion channels 18 and 20. One signal from an antenna of an antenna pair is feed to triple conversion channel 18, while the other antenna of that pair is feed to triple conversion channel 20. Oscillator circuitry 19 has three oscillator signal generators to down shift the frequency of the received radio frequency carrier. The outputs of triple conversion channels 18 and 20 are feed to phase detector 21 to produce an output of the phase discriminator 10.

As shown in FIG. 3 of the present invention, a line connection 12 is connected to the AGC output triple conversion channel 18. Line connection 12 is used to provide a signal strength indication of the radio frequency carrier as discussed above to the threshold detector 13. The threshold detector 13 compares the signal strength of the AGC output from line connection 12 with a predetermined signal strength from a variable resistor 14. Variable resistor 14 is adjustable to provide a variable predetermined signal strength to the threshold detector 13. If the AGC signal strength is less than the predetermined signal strength, then threshold detector 13 produces an alert signal A at its output. The alert signal A is selective delivered to one of the alert signal indicators including an audio generator 16 or a vibration device 17 in accordance with the setting of a switch 7, as discussed above.

It is only necessary for one of the discriminator circuits of one of the antenna array pairs to have a line connection 12 to produce the AGC signal at its output. For example, FIG. 4 of the present invention illustrates that the line connection 12 is connected to the phase discriminator circuit of the antenna pair $W_1$ and $X_1$. All other phase discriminator circuits would be lacking the connection 12.

Figure 5:
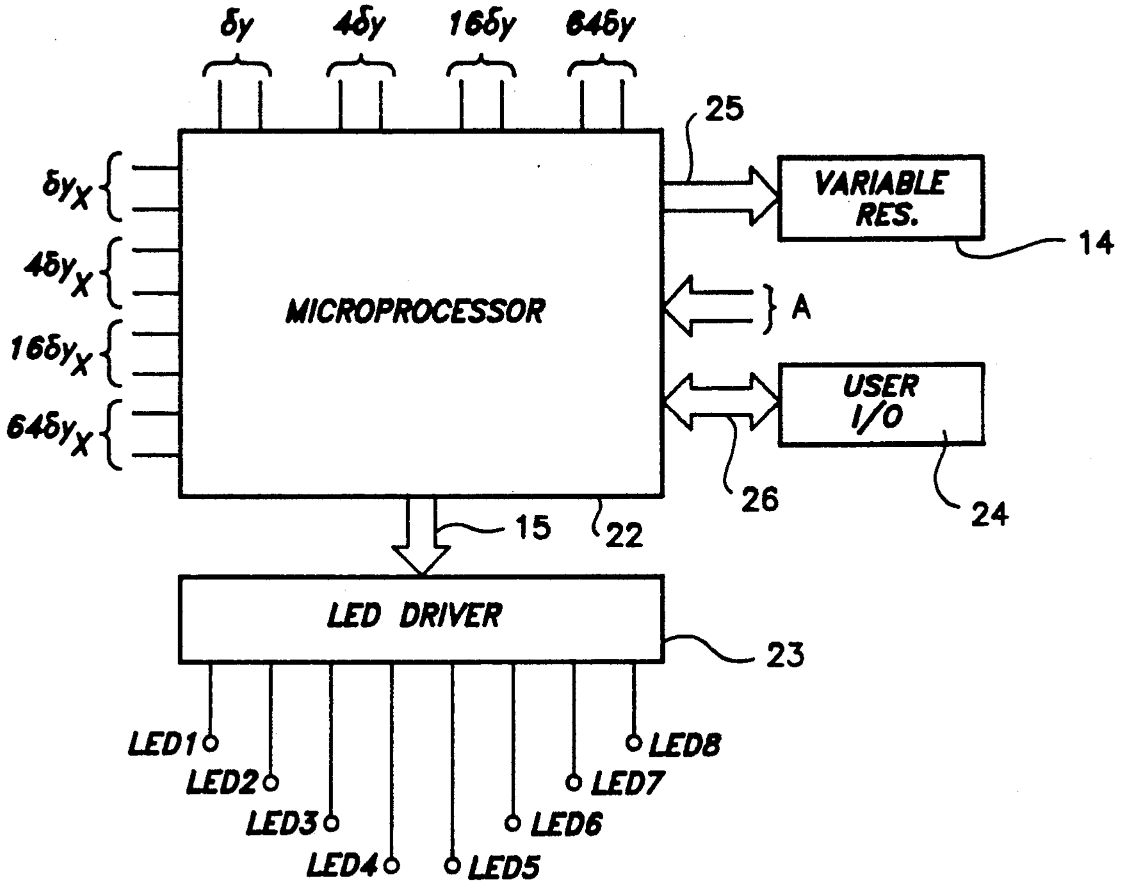
FIG. 5 is a partial block diagram of the present invention.

As shown in FIG. 5 of the present invention, the outputs of the phase discriminator circuits are provided to a microprocessor controller 22 to determine the propagation angle of the radio frequency carrier signal. Given a particular propagation angle, the microprocessor controller 22 provides the LED driver 23 with display digital control signals 15. For example, the display digital control signals may be made from eight binary digital signals D1-D8. If D1 is a one then LED1 is lit up; otherwise, it is not lit up. Likewise, if D2 is a one the LED2 is lit up; otherwise it is not lit up. This is true for all of the LEDs.

As shown in FIG. 6, for each unique propagation angle detected, a particular set of display digital control signals 15 is provided to the LED driver 23 by microprocessor controller 22. As shown in FIG. 7, and as discussed above, the adult user is assumed to be facing in a given reference direction which is illustrated on the display D by a linear direction from the emblem E to the first light generator LED1.

If the location monitoring device is used as disclosed above in the preferred embodiment, if the child is located to the exactly to the right of the adult then the propagation angle would be 90 degrees and the LED3 would be lit. If the child is approximately to the right of the adult, then the propagation angle is approximately 90 degrees. The LED3 would still light up if the propagation angle of the radio frequency carrier is within a given predetermined tolerance of 90 degrees. In this manner, the LED which is closest to representing the propagation angle as illustrated by the relationship of propagation angle and LED position as shown in FIG. 7, is the LED which is lit up. As shown in FIG. 6, if the propagation angle is between two LEDs within another given tolerance, both LEDs may be lit up.

As shown in FIG. 6, and discussed above, there exists a one to one correspondence between any given detected propagation angle and the display digital control signals 15. The data of FIG. 6 may be stored in a memory location of the microprocessor controller 22. Part of the memory data allows for the actuation of one of the LEDs, while other parts of the memory data allow for the actuation of two LEDs. For example, if the propagation angle is 341 degrees to 19 degrees only LED1 is lit, while if the angle is 26 degrees to 64 degrees only LED2 is lit, etc. However, if the propagation angle is 20 degrees to 25 degrees both LED1 and LED2 are lit, while if the angle is 65 degrees to 70 degrees both LED2 and LED3 are lit, etc.

The microprocessor controller 22 also controls the display 6 and receives inputs from the buttons 3-5. This is illustrated by user input/output interface 24 which interfaces with the microprocessor controller 22 via digital signals 26. The microprocessor controls the variable resistor 14 in accordance with digital signals 26. The alert signal A is also provided to the microprocessor controller 22 when generated by the threshold detector 13 to enable the microprocessor controller 22 to provide display digital control signals 15 to the LED driver 23 to light up one or more of the LEDs.

While a particular preferred embodiment has been presented, it is to be understood that the scope of the invention includes all modifications thereto within the spirit of the invention. For example, other light generators known in the art could be substituted for the LEDs. Further, while Robinson et al. disclose that the propagation angle can take on positive or negative values, e.g., ±180 degrees, it is simple convert this angle to a positive angle only if it were negative. For example, −90 degrees is equal to 270 degrees.

It is to be understood that the present invention is not limited to the sole embodiment described above, but encompasses any and all embodiments within the scope of the following claims.

I claim:

1. A location monitoring device for alerting a user when a locating transmitter which transmits a carrier having a predetermined frequency with a predetermined signal strength is located outside a predetermined proximity radius from said location monitoring device, wherein said location monitoring device displays the relative location of the transmitter once outside the predetermined proximity radius, the location monitoring device comprising:

- a compact portable outer housing having a front side and a back side;
- a display having a plurality of light generators located around a center of said display on said front side of said outer housing;
- carrier reception means for detecting said carrier propagating in a given linear direction from said locating transmitter to said location monitoring device;
- direction detecting means for determining a propagation angle as measured between said given linear direction as detected by said carrier reception means and a reference linear direction;
- signal strength detection means for determining the signal strength of said carrier detected by said carrier reception means;
- threshold detection means for generating an alert signal whenever said signal strength as determined by said signal strength detection means drops below a predetermined signal strength threshold value, thereby indicating that said locating transmitter is located outside of said predetermined proximity radius;
- alert signal indication means responsive to said alert signal for indicating to the user that said locating transmitter is outside of said predetermined proximity radius;
- a display driver having an input for receiving display digital control signals for controlling said display driver to activate at least one of said plurality of light generators;
- an emblem located at said center of said display with said plurality of lights located around said emblem at equal angular distances from each other when measured from any one of said plurality of light generators to said emblem and then to another successive one of said plurality of light generators and wherein said reference linear direction is defined by that direction from said emblem to a first light generator of said plurality of light generators; and,
- a controller having a first display controller means for supplying said display driver with said display digital control signals so as to activate one of said plurality of light generators in response to the reception of said alert signal,
- wherein said one of said plurality of light generators defines a locating linear direction when measured from said emblem to said one of said plurality of light generators and wherein a locating angular direction defined by the angle between said reference linear direction and said locating linear direction is substantially equal to said propagation angle within a given predetermined tolerance.

2. A location monitoring device as claimed in claim 1, further comprising means for varying said predetermined signal strength threshold value.

3. A location monitoring device as claimed in claim 2, further comprising means displaying a numeric value, wherein said numeric value is equal to the maximum distance the locating transmitter can be without activating said alert signal indication means.

4. A location monitoring device as claimed in claim 3, wherein said alert signal indication means comprises an audio tone generator for generating an audible signal.

5. A location monitoring device as claimed in claim 3, wherein said alert signal indication means comprises vibrator.

6. A location monitoring device as claimed in claim 1, wherein said carrier reception means comprises:

a first linear antenna array having a first plurality of successive antenna pairs; and a second linear antenna array arranged orthogonally to said first linear antenna array and having a second plurality of successive antenna pairs, wherein each of said first plurality of successive antenna pairs has all of the other prior first plurality of successive antenna pairs thereof located therebetween and wherein each of said second plurality of successive antenna pairs has all other prior second plurality of successive antenna pairs thereof located therebetween.

7. A location monitoring device as claimed in claim 6, wherein said direction detecting means comprises:

a first plurality of phase discriminators, wherein each one thereof receives output signals from one of said first plurality of successive antenna pairs;

a first plurality of logic circuits, wherein each one thereof receives output signals from one of said first plurality of phase discriminators;

a second plurality of phase discriminators, wherein each one thereof receives output signals from one of said second plurality of successive antenna pairs; and a second plurality of logic circuits, wherein each one thereof receives outputs signals from one of said second plurality of phase discriminators, wherein said first plurality of logic circuits provide a Cartesian coordinate along said reference linear direction and wherein said second plurality of logic circuits provide a Cartesian coordinate along a linear direction orthogonal to said reference linear direction and passing through said center of said display.

8. A location monitoring device as claimed in claim 7, wherein each of said first and second plurality of phase discriminators comprise:

a first frequency conversion channel having a plurality of mixing stages located therein for down shifting the frequency of a signal input thereto to produce a first down shifted frequency signal at an output thereof while maintaining the phase integrity of said signal input thereto within said first down shifted frequency signal;

a second frequency conversion channel having a plurality of mixing stages located therein for down shifting the frequency of a signal input thereto to produce a second down shifted frequency signal at an output thereof while maintaining the phase integrity of said signal input thereto within said second down shifted frequency signal;

oscillator circuitry for producing mixing frequencies for said first and second frequency conversion channels; and a phase detector circuit for receiving said first and second down shifted frequencies and producing an output signals for one of said first and second plurality of phase discriminators, wherein said signal input to said first frequency conversion channel receives an output signal from one antenna of one pair member of the first and second plurality of successive antenna pairs and wherein said signal input to said second frequency conversion channel receives an output signal from the other pair member of said one of the first and second plurality of successive antenna pairs.

9. A location monitoring device as claimed in claim 8, wherein each of said first and second frequency conversion channels include automatic gain control circuits, wherein said signal strength detection means includes an output connected to one of said automatic gain control circuits, and wherein said controller is a microprocessor controller.

10. A location monitoring device as claimed in claim 9, wherein said threshold detection means is connected to said output of one of said automatic gain control circuits and outputs said alert signal when said output of one of said automatic gain control circuits drops below said predetermined value, wherein said predetermined value represents a particular average voltage level.

11. A location monitoring device as claimed in claim 10, wherein said alert signal indication means includes a manual switch for selectively routing said alert signal to an audio generator activated upon the receipt of said alert signal and a vibration device activated upon the receipt of said alert signal.

12. A location monitoring device as claimed in claim 11, wherein said threshold detector receives a predetermined digital signal from said microprocessor controller indicating the value of said predetermined value.

13. A location monitoring device as claimed in claim 12, further including a user input to said microprocessor controller for allowing said user to control said predetermined digital value and a user display for displaying a numeric value indicating the maximum distance the locating transmitter can be without activating said alert signal indication as set by said predetermined digital value.

14. A location monitoring device as claimed in claim 13, wherein said microprocessor controller further includes a second display controller means for including into said display digital control signals, digital information for activating another one of said plurality of light generators besides said one of said plurality of light generators in response to said alert signal if another locating linear direction defined by a direction passing from said emblem to said another one of said plurality of light generators defines an another angle between said reference linear direction and said another locating linear direction also substantially equal to said propagation angle within another given predetermined tolerance.

* * * * *